United States Patent Office 3,508,790
Patented Apr. 28, 1970

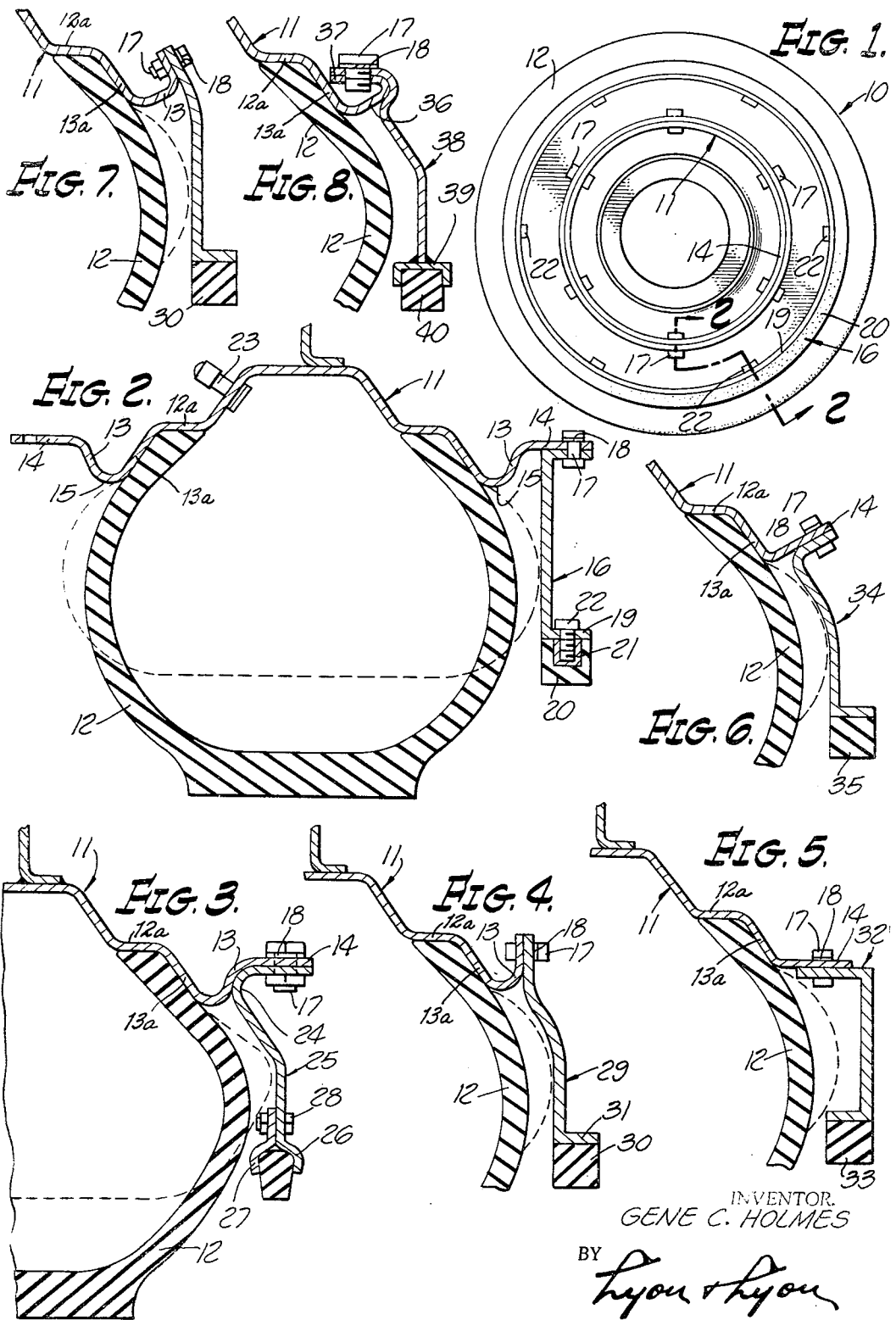

3,508,790
TIRE RIM FOR MOUNTING AN AUXILIARY
SAFETY WHEEL ON A MOTOR VEHICLE
Gene C. Holmes, 5708 Briarcliff Road,
Hollywood, Calif. 90028
Filed Dec. 20, 1967, Ser. No. 692,077
Int. Cl. B60c 17/04
U.S. Cl. 301—39                              15 Claims

ABSTRACT OF THE DISCLOSURE

A tire rim for a motor vehicle wheel which is provided with an outwardly extending flange on either or both sides thereof for mounting a safety wheel to the vehicle wheel. Various configurations of suitable rims and safety wheels and the means of attaching them are disclosed.

---

In the past various schemes have been proposed for mounting a safety wheel onto the wheel of motor vehicles so that in the event of a tire blowout or other tire deflation, the weight of the vehicle would be transferred to the safety wheel making it possible to control the vehicle and prevent and damage to tire or rim. While some of these prior schemes are satisfactory from the theoretical standpoint, they are not satisfactory from the everyday practical standpoint for several reasons. First, many of the prior schemes required drastic modification of the vehicle wheel itself because the mounting means for the safety wheel were connected directly to or were part of the vehicle wheel. Second, the safety wheels were difficult and time consuming to attach or detach. Third, the safety wheel interfered with the replacement of the tire by conventional equipment.

According to the present invention, these disadvantages are overcome by providing a new type of tire rim for a vehicle wheel which tire rim can be easily made by slight modification to present equipment and which is as strong as or stronger than conventional tire rims. The tire rim of the present invention is provided with outwardly extending flanges to which a safety wheel can be attached in a variety of ways. The rim is designed so that the flanges do not interfere with the mounting or removal of the tire. The safety wheel is connected to the rim by a number of bolts and can be quickly and easily removed to facilitate tire changing.

It is therefore an object of the present invention to provide a tire rim suitable for mounting a safety wheel on a motor vehicle or trailer.

The objects and advantages of the present invention will become more apparent upon reference to the accompanying description and drawings in which:

FIGURE 1 is a side elevation of vehicle wheel equipped with the rim and safety wheel of the present invention;

FIGURE 2 is a cross-sectional view taken along lines 2—2 of FIGURE 1 and showing a first embodiment of a tire rim according to the present invention;

FIGURE 3 is a cross-sectional view showing a second embodiment of a tire rim according to the present invention;

FIGURE 4 is a cross-sectional view showing a third embodiment of a tire rim according to the present invention;

FIGURE 5 is a cross-sectional view showing a fourth embodiment of a tire rim according to the present invention;

FIGURE 6 is a cross-sectional view showing a fifth embodiment of a tire rim according to the present invention;

FIGURE 1 is a sixth embodiment of a tire rim according to the present invention; and FIGURE 8 is a seventh embodiment of a tire rim according to the present invention.

As shown in FIGURE 1, a vehicle wheel 10 has a rim 11 attached thereto on which is mounted an inflatable tire 12 which may be tubeless or may have an inner tube. The rim 11 is provided on either side with a tire bead 12a which is adapted to receive the inflatable tire 12. The tire bead 12a has a radially outwardly extending flange 12a and the flange 13a includes a curved extension 13 which ends in a mounting portion 14. The periphery 15 defined by the radially outwardly extending flange 13a is designed to fall at or above the point where the tire is stretched by the conventional tire changing equipment and forced onto the tire rim. The mounting portion 14 preferably has a lesser diameter than does the periphery 15 so that the mounting portion does not interfere with the mounting or changing of a tire.

Mounted to the mounting portion 14 is a safety wheel 16 by means of a series of bolts 17 and lock washers 18. The safety wheel 16 is provided with a horizontal flange 19 at its outer end which receives the safety tire 20. The tire 20 is preferably hard rubber tire tread having square shanks 21 molded therein and threaded to receive cap screws 22 for attaching it to the flange 19. The rim 11 is provided with the conventional air valve 23.

As can be seen, when the tire 12 is fully inflated the safety tire 20 will not engage the ground. However, when the tire 12 is deflated, as shown in phantom in FIGURE 2, the safety tire 20 will engage the ground and prevent damage to the tire 12 or to the tire rim 11. As shown, the safety wheel is mounted on the inside of the wheel 10. It could, of course, be mounted on the outside or safety wheels could be mounted on both the inside and the outside of the wheel 10. In the event that the tire 12 must be changed, the safety wheel 16 can be rapidly removed by unbolting the bolts 17, shown as six in number. The tire can then be quickly replaced, the shape of the rim of the present invention assuring that it will not interfere with the use of conventional equipment for this purpose and that it will not damage the tire.

FIGURES 3 through 8 show other modifications of the tire rim and safety wheel of the present invention. In these figures, the same reference numerals used in FIGURES 1 and 2 will be used for the same elements. In FIGURE 3, a safety wheel 25 is provided with a curved portion 24 at its upper end which matches the configuration of the curved portion 13 and the mounting portion 14 of the rim 11 so as to provide additional strength to the wheel 25. The outer circumference of the wheel 25 is provided with a rim 26 which cooperates with a ring 27 to hold the safety tire 20 in place. As shown, the rim 26 and ring 27 are bolted together with a series of bolts 28. In FIGURE 4, the mounting portion 14 is deleted from the rim 11 and a safety wheel 29 is bolted directly to the inwardly projecting portion of the curved extension 13 which is generally normal to the axis of the wheel 10 or the rim 11 and tire 12. As shown in FIGURE 4, a safety tire 30 is bonded in a suitable fashion to a horizontal extension 31 of the safety wheel 29. As shown in both FIGURES 3 and 4, the safety wheels are provided with a suitable curvature so that they are not engaged by the tire 12 upon deflation thereof.

In FIG. 5, the rim 11 is not provided with a curved portion 13 but ends directly in a mounting portion 14 which is generally coaxial with the wheel 10 and tire 12. A safety wheel 32 is bolted to this mounting portion and is provided with a safety tire 33. In this type construction care must be taken that the mounting portion 14 has a sufficiently small diameter so as not to interfere with the mounting or demounting of a tire.

FIGURE 6 shows an embodiment of the invention where the mounting portion 14 is not horizontal but rather is bent at a right angle from the portion of the mounting portion which engages the tire 12. A safety wheel 34 having a safety tire 35 is then bolted to the mounting portion 14. The embodiment of the invention shown in FIGURE 7 is quite similar to that shown in FIGURE 4, the only difference being that the curved portion 13 of the rim 11 is made in the form of a block U rather than being rounded as shown in FIGURE 4.

In FIGURE 8, the rim 11 is provided with an extension 36 which extends at a right angle from the flange 13a and is provided with a horizontal mounting portion 37 that is directed back towards the remainder of the flange 13a and which is generally coaxial with the wheel 10 or tire rim 11 and tire 12. The safety wheel 38 is provided with a more or less hook-shaped configuration which wraps around the mounting portion 37 and the extension 36. A rim 39 is welded to the outer end of the wheel 38 and carries a safety tire 40.

If desired, of course, the present invention could be used with a conventional tire rim. In such a case, an extender having the same shape as those shown in any of the previous embodiments could be welded to the conventional tire rim to give the same effective structure as that shown. Alternatively, the conventional tire rim could be provided with a split ring filler locked in place by flat head cap screws or the like threaded through the rim. The extenders could then be bolted to the split ring. In any event, as can be seen, the resulting structure will have all the benefits of the invention.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A safety vehicle wheel assembly, comprising: a tire rim including a tire bead adapted to receive an inflatable tire, said tire bead having a flange extending radially outwardly and including an integrally formed extension curving radially inwardly and terminating in a substantially flat mounting portion, a safety wheel including a radially inner flat mounting portion abutting said rim mounting portion, and removable fastening means extending through said mounting portions.

2. The wheel assembly of claim 1, wherein said rim mounting portion is generally coaxial with said tire rim.

3. The wheel assembly of claim 1, wherein said rim mounting portion is generally normal to the axis of said tire rim.

4. The wheel assembly of claim 1, wherein said extension extends substantially at a right angle from said flange.

5. The wheel assembly of claim 1, wherein said extension extends substantially at a right angle from said flange and said rim mounting portion extends substantially at a right angle from said extension.

6. The wheel assembly of claim 1, wherein said extension extends substantially at a right angle from said flange and said rim mounting portion extends toward said flange and is generally coaxial with said tire rim.

7. The wheel assembly of claim 1, wherein said safety wheel has an outer diameter greater than the outer diameter of said tire rim.

8. A safety vehicle wheel assembly, comprising: a tire rim including a tire bead adapted to receive an inflatable tire, said tire bead having a flange extending radially outwardly to define the outer diameter of said tire rim, said outer diameter of said tire rim limited to avoid interference with the mounting of the inflatable tire, said flange including an integrally formed extension curving radially inwardly and terminating in a substantially flat mounting portion, a safety wheel having an outer diameter greater than said outer diameter of said tire rim and including a radially inner flat mounting portion abutting said rim mounting portion, and removable fastening means extending through said mounting portion whereby said safety wheel is mounted solely on said tire bead.

9. The wheel assembly of claim 8, wherein said rim mounting portion is generally coaxial with said tire rim.

10. The wheel assembly of claim 9, wherein said safety wheel extends substantially at a right angle from said rim mounting portion.

11. The wheel assembly of claim 9, wherein said safety wheel is contoured to engage a portion of said extension.

12. The wheel assembly of claim 8, wherein said rim mounting portion is generally normal to the axis of said tire rim.

13. The wheel assembly of claim 8, wherein said extension extends substantially at a right angle from said flange.

14. The wheel assembly of claim 8, wherein said extension extends substantially at a right angle from said flange and said rim mounting portion extends substantially at a right angle from said extension.

15. The wheel assembly of claim 8, wherein said extension extends substantially at a right angle from said flange and said rim mounting portion extends towards said flange and is generally coaxial with said tire rim.

References Cited

UNITED STATES PATENTS

| | | |
|---|---|---|
| 1,948,136 | 2/1934 | Scheckler. |
| 2,110,929 | 3/1938 | De Palma. |
| 2,019,120 | 10/1935 | Cunningham. |
| 2,049,268 | 7/1936 | Ludwick. |
| 2,670,994 | 3/1954 | Parrott. |
| 3,397,014 | 8/1968 | Nigrelli. |

FOREIGN PATENTS

| | | |
|---|---|---|
| 620,046 | 1/1927 | France. |

RICHARD M. JOHNSON, Primary Examiner